(12) United States Patent
Hiramatsu et al.

(10) Patent No.: US 12,441,147 B2
(45) Date of Patent: Oct. 14, 2025

(54) SUSPENSION DEVICE FOR VEHICLE

(71) Applicant: MAZDA MOTOR CORPORATION, Hiroshima (JP)

(72) Inventors: Masaya Hiramatsu, Hiroshima (JP); Takashi Nishi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 334 days.

(21) Appl. No.: 18/189,770

(22) Filed: Mar. 24, 2023

(65) Prior Publication Data

US 2023/0339279 A1    Oct. 26, 2023

(30) Foreign Application Priority Data

Apr. 21, 2022  (JP) .................. 2022-070016

(51) Int. Cl.
*B60G 15/07*    (2006.01)
*B60G 7/00*    (2006.01)
(Continued)

(52) U.S. Cl.
CPC ............ *B60G 15/07* (2013.01); *B60G 7/001* (2013.01); *B60K 1/04* (2013.01); *B60L 50/66* (2019.02)

(58) Field of Classification Search
CPC .. B60G 15/07; B60G 7/001; B60G 2200/142; B60G 2200/422; B60G 2200/464; B60G 2200/466; B60G 2202/31; B60G 2204/143; B60G 2300/50; B60G 7/02; B60G 15/062; B60G 3/06; B60G 15/02; B60G 7/005; B60G 2206/122; B60G 2206/124; B60K 1/04; B60K 1/00; B60L 50/66
See application file for complete search history.

(56) References Cited

U.S. PATENT DOCUMENTS 3,642,084 A  *  2/1972  Takahashi ................ B60G 3/24
                                              180/257
4,652,010 A  *  3/1987  Sugasawa .......... B60G 17/0162
                                              280/5.511
(Continued)

FOREIGN PATENT DOCUMENTS

JP        2011-031739 A      2/2011

*Primary Examiner* — Paul N Dickson
*Assistant Examiner* — Shams Dhanani
(74) *Attorney, Agent, or Firm* — Studebaker Brackett PLLC

(57) ABSTRACT

A suspension device for an electric vehicle prevents change in pitching behavior of the vehicle during regenerative and friction braking. The suspension device includes a front suspension arm that swings in a vehicle up-down direction with reference to a front wheel swinging axis; a front damper approximately perpendicular to the front wheel swinging axis in a side view; a rear suspension arm that swings in the vehicle up-down direction with reference to a rear wheel swinging axis; and a rear damper approximately perpendicular to the rear wheel swinging axis in a side view. The front wheel swinging axis and a first imaginary line perpendicular to a direction of extension of the front damper are approximately parallel to each other. The rear wheel swinging axis and a second imaginary line perpendicular to a direction of extension of the rear damper are approximately parallel to each other in a side view.

9 Claims, 10 Drawing Sheets

(51) Int. Cl.
    *B60K 1/04*         (2019.01)
    *B60L 50/60*       (2019.01)

(56) References Cited

U.S. PATENT DOCUMENTS

| | | | | |
|---|---|---|---|---|
| 4,802,689 | A * | 2/1989 | Hoffmann | B60G 9/00 |
| | | | | 280/124.1 |
| 6,070,892 | A * | 6/2000 | Noutomi | B60G 11/20 |
| | | | | 280/124.167 |
| 8,205,900 | B1 * | 6/2012 | Moravy | B60G 3/20 |
| | | | | 280/124.138 |
| 11,712,964 | B1 * | 8/2023 | Drach | B60K 7/0015 |
| | | | | 180/245 |
| 11,912,361 | B1 * | 2/2024 | Alexander | B60G 15/07 |
| 2004/0140141 | A1 * | 7/2004 | Soatti | B62M 17/00 |
| | | | | 180/227 |
| 2005/0098964 | A1 * | 5/2005 | Brown | B60G 3/06 |
| | | | | 280/5.5 |
| 2009/0160153 | A1 * | 6/2009 | Kunert | B60G 3/20 |
| | | | | 280/124.138 |
| 2012/0280465 | A1 * | 11/2012 | Meitinger | B60G 3/20 |
| | | | | 280/124.109 |
| 2015/0266350 | A1 * | 9/2015 | Morino | B60G 3/06 |
| | | | | 280/124.134 |
| 2016/0297266 | A1 * | 10/2016 | Hinz | B60G 15/12 |
| 2018/0001725 | A1 * | 1/2018 | Andou | B60G 3/20 |
| 2018/0215222 | A1 * | 8/2018 | Matsushita | B60G 7/001 |
| 2018/0264929 | A1 * | 9/2018 | Tamura | B60G 3/28 |
| 2019/0263213 | A1 * | 8/2019 | Sakka | B60G 17/08 |
| 2020/0102014 | A1 * | 4/2020 | Sakai | B62D 21/07 |
| 2022/0048347 | A1 * | 2/2022 | Bifano | B60G 3/145 |
| 2022/0111692 | A1 * | 4/2022 | Berardi | B60G 3/20 |
| 2023/0264557 | A1 * | 8/2023 | Yoshida | B62D 21/02 |
| | | | | 180/68.5 |

\* cited by examiner

SUSPENSION DEVICE FOR VEHICLE

TECHNICAL FIELD

The present disclosure relates to a suspension device for a vehicle and, particularly, to a suspension device for a vehicle equipped with an electric motor.

BACKGROUND ART

Conventionally, a suspension control device for setting an anti-dive, anti-lift suspension geometry to front wheels and rear wheels is known. See, Japanese Patent Laid-Open No. 2011-031739.

SUMMARY

On the other hand, amidst research and development related to electric cars conducted in recent years, the present inventors carried out diligent studies with respect to an optimum suspension structure for electric cars.

Normally, a suspension geometry of a vehicle is set in consideration of a change in an attitude of the vehicle during braking and when being driven. Furthermore, with electric cars, in addition to conventional friction brakes which apply a braking force to wheels using a hydraulic system, regenerative brakes which cause an electric motor to be driven as a generator to charge a battery are used during braking.

In this case, between friction brakes and regenerative brakes, a phenomenon occurs in which, due to a difference in points of application of a braking force, anti-lift angles/anti-dive angles during braking differ. In other words, with friction brakes, since a point of application of the braking force thereof is at a center of tire-ground contact, an angle formed by a straight line connecting the center of tire-ground contact and an instantaneous center of rotation of a wheel relative to the ground is the anti-lift angle (rear wheel)/anti-dive angle (front wheel) but, on the other hand, with regenerative brakes, since a point of application of the braking force thereof is a wheel center, an angle formed by a straight line connecting the wheel center and an instantaneous center of rotation of a wheel relative to the ground is the anti-lift angle/anti-dive angle. Therefore, for example, when subjecting friction brakes and regenerative brakes to coordinated control or the like, there is a risk that changing the braking force of the friction brakes and the braking force of the regenerative brakes may cause an unstable pitching behavior to be created in a vehicle as a whole and may impart a sense of discomfort to an occupant.

In consideration thereof, the present disclosure has been made in order to solve the problem described above by providing, in a vehicle equipped with an electric motor, a suspension device for a vehicle capable of preventing a change in a pitching behavior of the entire vehicle during use of regenerative brakes and friction brakes.

In order to solve the problem described above, the present disclosure relates to a suspension device for a vehicle equipped with an electric motor for transmitting a drive force to at least one of a front wheel or a rear wheel via an output transmission shaft, the suspension device characterized by including: a front suspension arm capable of swinging in a vehicle up-down direction with reference to a front wheel swinging axis in a vehicle body-side mounting portion in a front portion of the vehicle; a front damper which extends in a direction perpendicular to the front wheel swinging axis in a side view; a rear suspension arm capable of swinging in the vehicle up-down direction with reference to a rear wheel swinging axis in a vehicle body-side mounting portion in a rear portion of the vehicle; and a rear damper which extends in a direction perpendicular to the rear wheel swinging axis in a side view, wherein the front wheel swinging axis and a first imaginary line perpendicular to a direction of extension of the front damper extend in a direction parallel to each other and the rear wheel swinging axis and a second imaginary line perpendicular to a direction of extension of the rear damper extend in a direction parallel to each other in a side view.

According to the present disclosure, in a suspension device for a vehicle equipped with an electric motor for transmitting a drive force to at least one of a front wheel or a rear wheel via an output transmission shaft, since a front wheel swinging axis and a first imaginary line perpendicular to a direction of extension of a front damper extend in a direction parallel to each other and a rear wheel swinging axis and a second imaginary line perpendicular to a direction of extension of a rear damper extend in a direction parallel to each other, an occurrence of a difference in behavior changes of a front portion of the vehicle and a rear portion of the vehicle can be prevented during braking of the front and rear wheels including a wheel (at least one of the front wheel or the rear wheel) on which a regenerative brake acts and, accordingly, a change in a pitching behavior of the entire vehicle can be prevented during use of the regenerative brakes and a friction brake, for example, when the friction brake and the regenerative brake are subjected to coordinated control, and a sense of discomfort imparted to an occupant can be reduced.

In addition, in the present disclosure, preferably, the front wheel swinging axis and the rear wheel swinging axis respectively extend in a direction coinciding with a vehicle front-rear direction in a bottom view. Since the front wheel swinging axis and the rear wheel swinging axis respectively extend in a direction coinciding with the vehicle front-rear direction in a bottom view, an occurrence of a difference in behavior changes of the front portion of the vehicle and the rear portion of the vehicle can be more reliably prevented during braking of the front and rear wheels including a wheel (at least one of the front wheel or the rear wheel) on which a regenerative brake acts and, accordingly, a change in a pitching behavior of the entire vehicle can be prevented, for example, when the friction brake and the regenerative brake are subjected to coordinated control, and a sense of discomfort imparted to an occupant can be reduced. In addition, since the front wheel swinging axis and the rear wheel swinging axis respectively extend in a direction coinciding with the vehicle front-rear direction in a bottom view, (respective wheel centers of) the front wheel and the rear wheel can each be made to linearly swing in a same direction as the direction of extension of the dampers and, accordingly, a change in the behavior of the entire vehicle during use of the regenerative brake and the friction brake can be prevented more effectively.

Furthermore, in the present disclosure, preferably, the front wheel swinging axis and the rear wheel swinging axis each extend obliquely upward toward a front of the vehicle in a side view. Since an anti-lift angle is particularly formed in a rear suspension, a lift of the rear portion of the vehicle body during use of the regenerative brake and the friction brake is prevented. In addition, according to the present disclosure, since the front wheel swinging axis and the rear wheel swinging axis extend obliquely upward toward the front of the vehicle in a side view, the front wheel swinging axis and a first imaginary line perpendicular to a direction of extension of the front damper extend in a direction parallel to each other, and the rear wheel swinging axis and a second imaginary line perpendicular to a direction of extension of the rear damper extend in a direction parallel to each other, a difference between the behavior of the front portion of the vehicle and the behavior of the rear portion of the vehicle during braking of the front and rear wheels can be reduced and, accordingly, a change in a pitching behavior of the entire vehicle during use of the regenerative brake and the friction brake can be prevented.

In addition, in the present disclosure, preferably, the electric motor includes a rear electric motor which is mounted to the vehicle body in the rear portion of the vehicle and which drives the rear wheel, and the rear electric motor provided in the rear portion of the vehicle is used as a main drive source. Although a braking force of the regenerative brake which acts on the rear wheel increases, since the rear wheel swinging axis and the second imaginary line extend in a direction parallel to each other, a change in the pitching behavior of the rear portion of the vehicle during use of the regenerative brake and the friction brake on the rear wheel can be prevented more effectively. In addition, since the rear wheel is driven using the rear electric motor as a main drive source, the front wheel swinging axis and the first imaginary line perpendicular to the direction of extension of the front damper extend in a direction parallel to each other, and the rear wheel swinging axis and the second imaginary line perpendicular to the direction of extension of the rear damper extend in a direction parallel to each other, a lift of the front portion of the vehicle during travel start of the vehicle due to the use of the rear wheel as main drive wheel can be prevented.

Furthermore, in the present disclosure, preferably, the front wheel swinging axis and the rear wheel swinging axis each extend obliquely upward toward the front of the vehicle in a side view, the electric motor includes a front electric motor which is mounted to the vehicle body in the front portion of the vehicle and a rear electric motor which is mounted to the vehicle body in the rear portion of the vehicle, and the rear electric motor provided in the rear portion of the vehicle is used as a main drive. According to the present disclosure, a difference in anti-lift angles (anti-dive angles) between the regenerative brake and the friction brake does not occur or can be made extremely small in both the front wheel and the rear wheel, and a change in the behavior of the entire vehicle during use of the regenerative brake and the friction brake can thus be more reliably prevented. In particular, since the rear electric motor is used as a main drive, due to the anti-lift angle of the rear suspension, a lift of the rear portion of the vehicle body can be prevented during use of the regenerative brake and the friction brake.

In addition, in the present disclosure, preferably, the front suspension arm and the rear suspension arm are mounted to a vehicle body frame which extends in the vehicle front-rear direction from a battery case disposed in a lower portion of a center of the vehicle. According to the present disclosure, support rigidity of each of the front wheel and the rear wheel can be enhanced and a response delay to vehicle behavior (for example, a response delay to a cornering force) can be reduced.

Furthermore, in the present disclosure, preferably, the suspension device is a strut-type suspension device including front and rear wheel hub carriers to which wheel-side end portions of the front suspension arm and the rear suspension arm are respectively coupled and which respectively support the front wheel and the rear wheel, a lower portion of the front damper and a lower portion of the rear damper are respectively mounted to the hub carriers, and upper portions of the front damper and the rear damper are each mounted to the vehicle body. According to the present disclosure, the strut-type suspension can prevent a change in behavior of the entire vehicle during use of the regenerative brake and the friction brake.

With the suspension device for a vehicle according to the present disclosure, in a vehicle equipped with an electric motor, a change in a pitching behavior of the entire vehicle during use of regenerative brakes and friction brakes can be prevented.

DETAILED DESCRIPTION

Hereinafter, a suspension device for a vehicle according to an embodiment of the present disclosure will be described with reference to the accompanying drawings.

Figure 1:
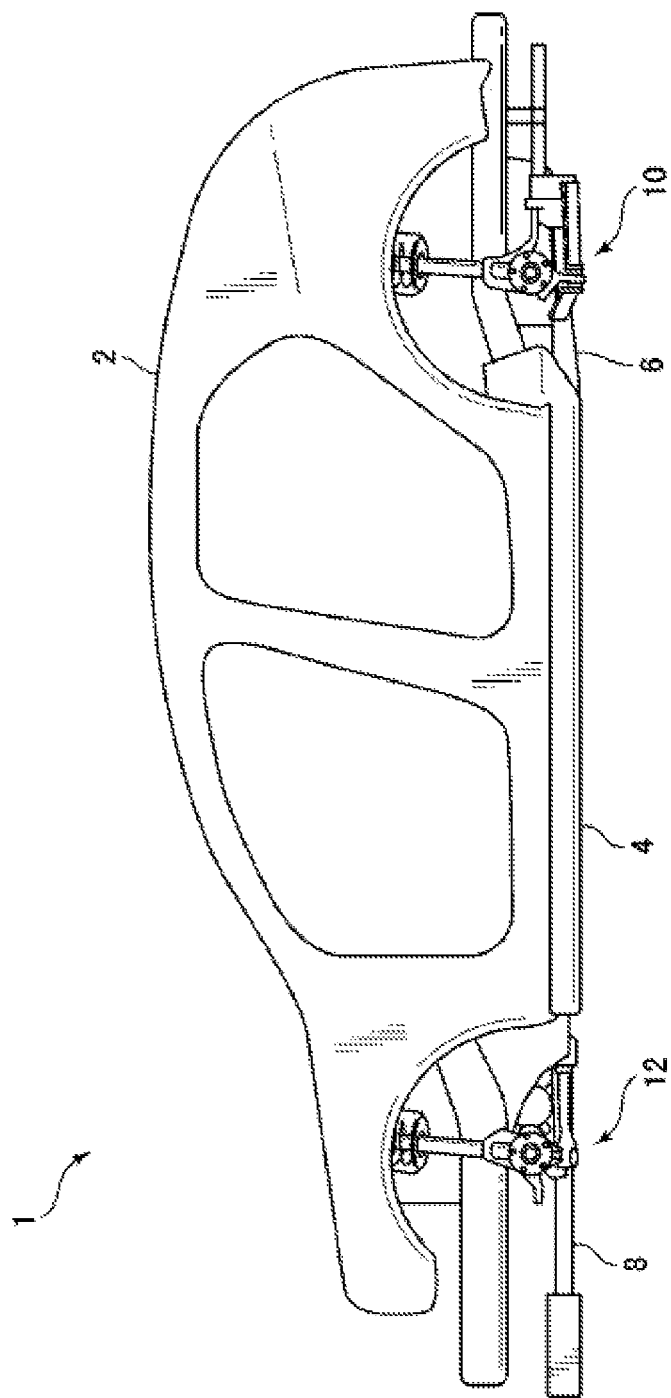
FIG. 1 is a side view showing a schematic configuration of a vehicle to which a suspension device for a vehicle according to an embodiment of the present disclosure has been applied.

First, a schematic configuration of a vehicle to which the suspension device for a vehicle according to the embodiment of the present disclosure has been applied will be described with reference to FIG. 1 and FIG. 2. FIG. 1 is a side view showing a schematic configuration of the vehicle to which the suspension device for a vehicle according to the embodiment of the present disclosure has been applied, and FIG. 2 is a perspective view showing, separated above and below, a vehicle body in an upper part of the vehicle, and a battery assembly, a vehicle body frame, a front suspension device, and a rear suspension device in a lower part of the vehicle shown in FIG. 1 as seen from a side of and from obliquely above the vehicle.

Figure 2:
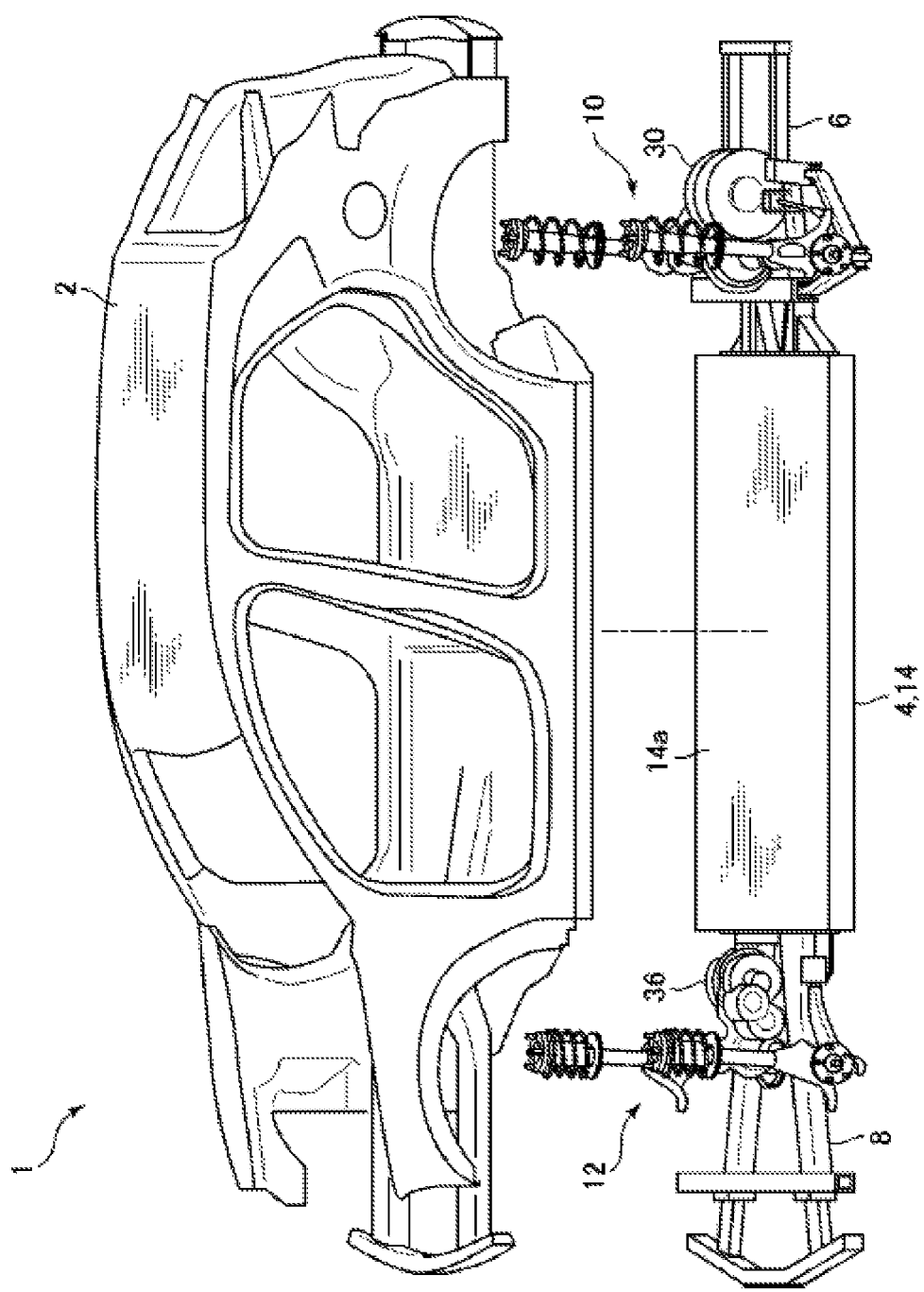
FIG. 2 is a perspective view showing, separated above and below, a vehicle body in an upper part of the vehicle, and a battery assembly, a vehicle body frame, a front suspension device, and a rear suspension device in a lower part of the vehicle shown in FIG. 1 as seen from a side of and from obliquely above the vehicle.

First, as shown in FIG. 1 and FIG. 2, a vehicle 1 includes a vehicle body 2 constituted of a monocoque body in an upper part of the vehicle 1 and, below the vehicle body 2, a battery assembly 4 provided in a center portion in a vehicle front-rear direction, a rear vehicle body frame 6 which extends toward the rear of the vehicle from the battery assembly 4, a front vehicle body frame 8 which extends toward the front of the vehicle from the battery assembly 4, a rear suspension device 10 mounted to the rear vehicle body frame 6, and a front suspension device 12 mounted to the front vehicle body frame 8.

The battery assembly 4 includes a battery case 14 and a battery main body (not illustrated). Although not illustrated in FIG. 1 and FIG. 2, the battery case 14 further includes a cover member 14a which includes frame members of four sides constituted of extruded material or the like in the present embodiment, the battery main body being housed inside the frame members of four sides, the cover member 14a covering the battery main body from above and below.

Figure 3:
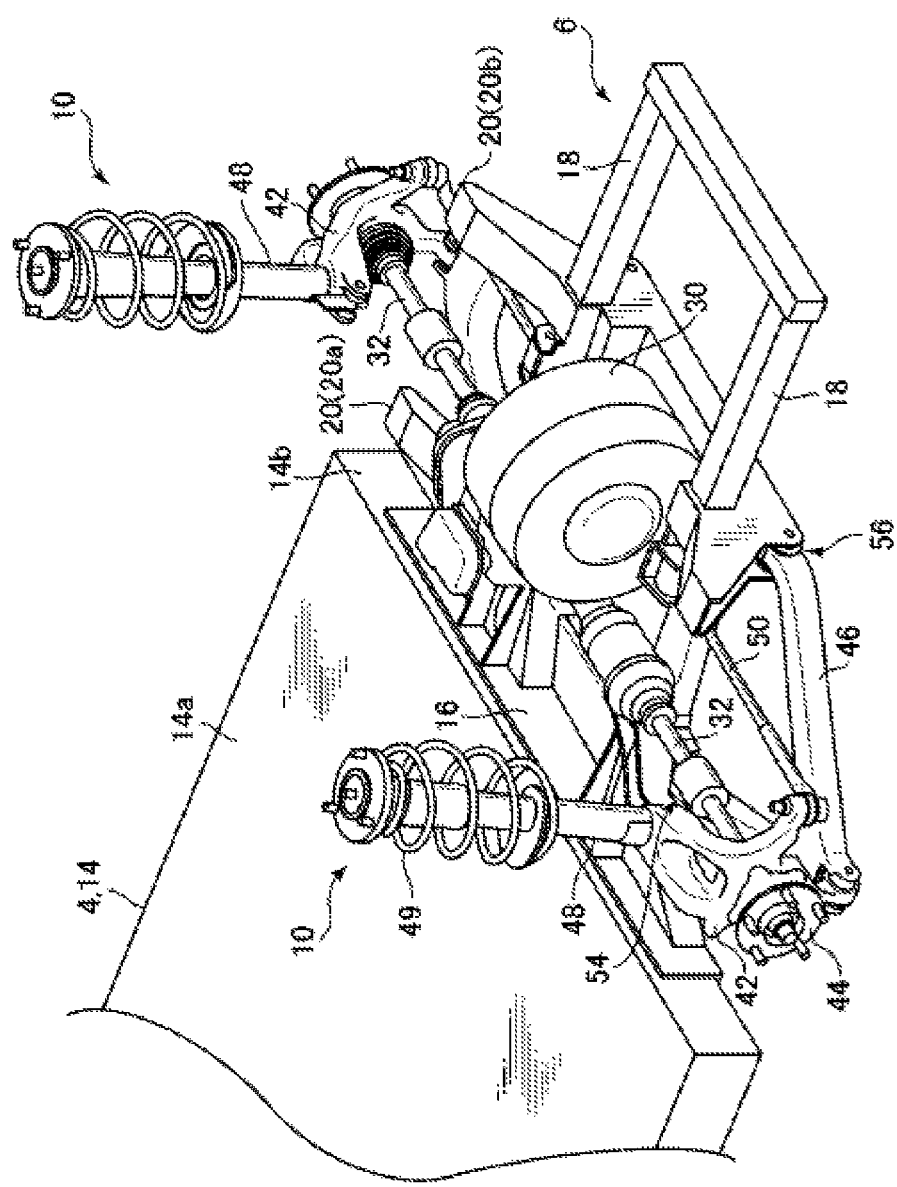
FIG. 3 is a perspective view showing the battery assembly, the vehicle body frame, and the rear suspension device in the lower part of the vehicle shown in FIG. 2 as seen from a rear of and from obliquely above the vehicle.
Figure 4:
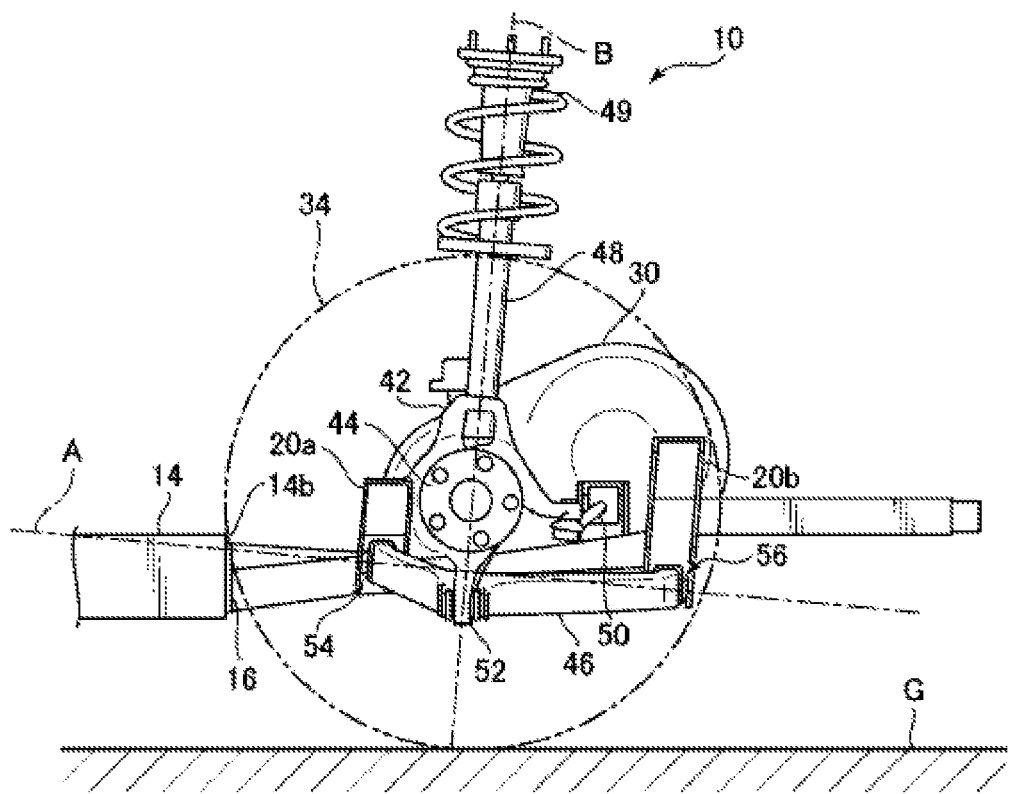
FIG. 4 is a side view of a rear suspension device on a left side of the vehicle in the rear suspension device shown in FIG. 3 as seen from the left side of the vehicle.
Figure 5:
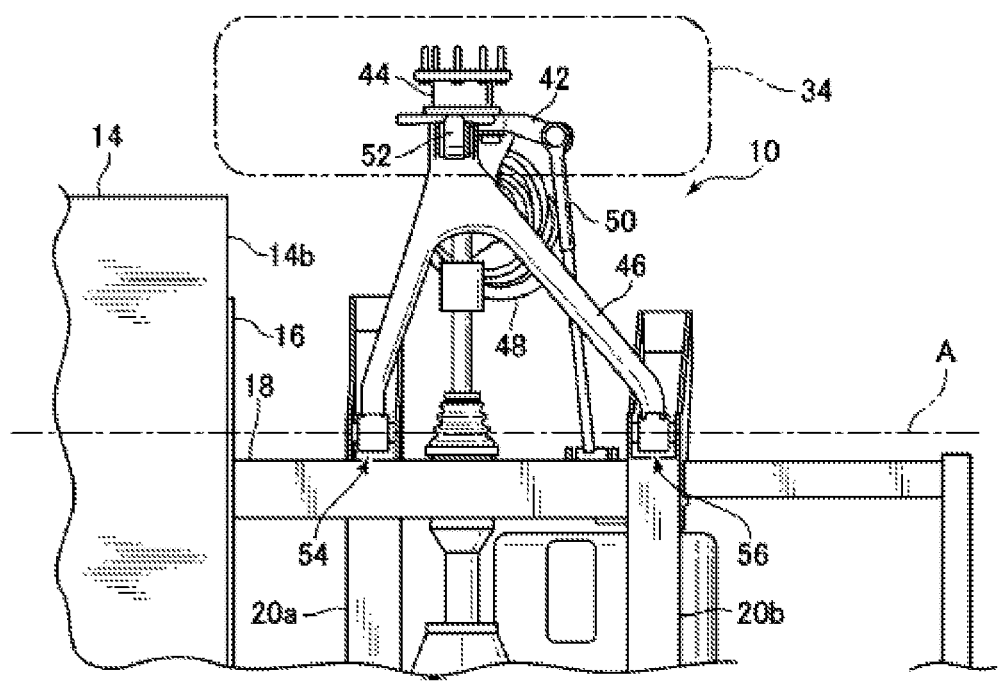
FIG. 5 is a bottom view of the rear suspension device on the left side of the vehicle in the rear suspension device shown in FIG. 3 as seen from below.
Figure 6:
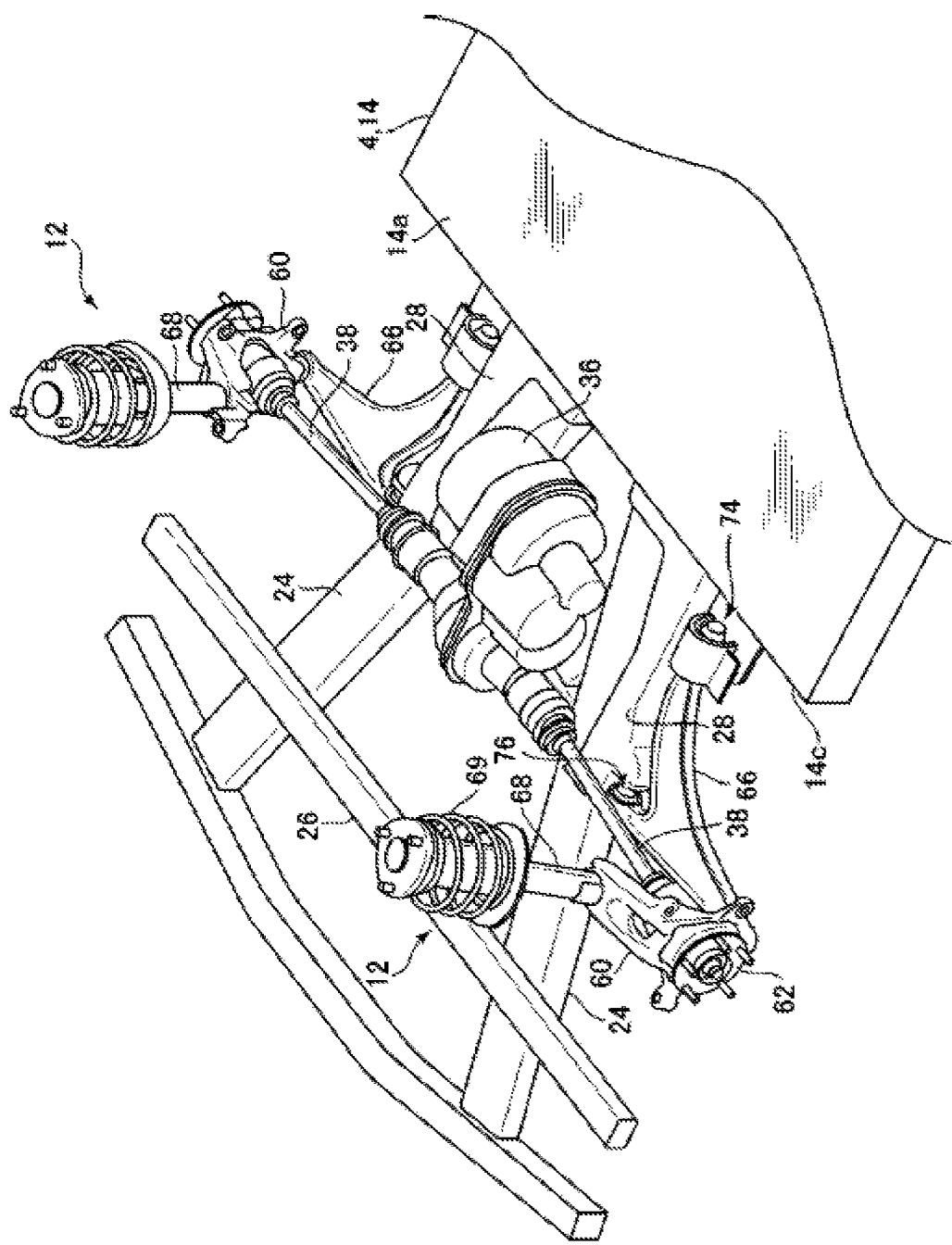
FIG. 6 is a perspective view showing the battery assembly, the vehicle body frame, and the front suspension device in the lower part of the vehicle shown in FIG. 2 as seen from the rear of and from obliquely above the vehicle.
Figure 7:
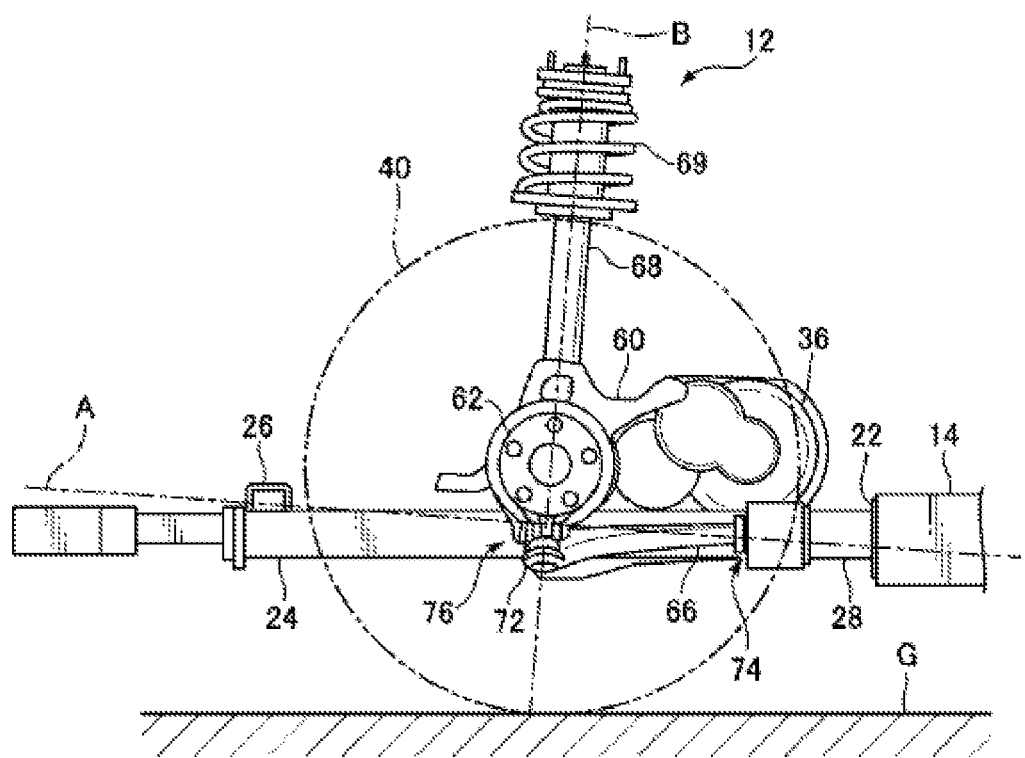
FIG. 7 is a side view of a front suspension device on the left side of the vehicle in the front suspension device shown in FIG. 6 as seen from the left side of the vehicle.
Figure 8:
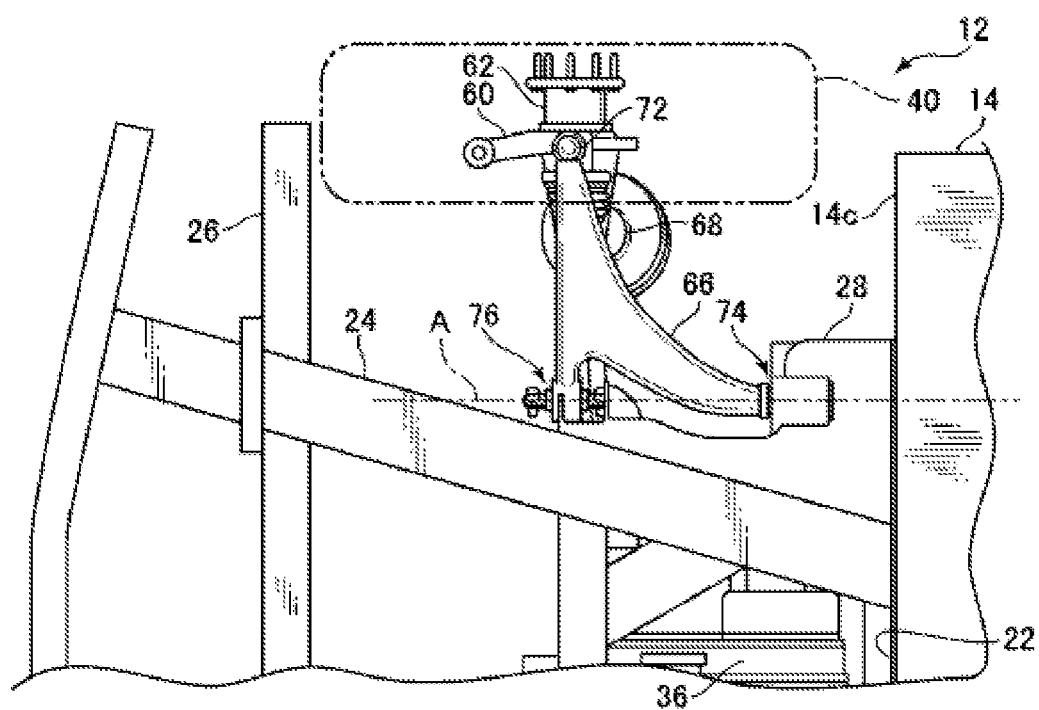
FIG. 8 is a bottom view of the front suspension device on the left side of the vehicle in the front suspension device shown in FIG. 6 as seen from below.

Next, a schematic configuration of each portion of the vehicle will be described with reference to FIG. 1 to FIG. 8. FIG. 3 is a perspective view showing the battery assembly, the vehicle body frame, and the rear suspension device in the lower part of the vehicle shown in FIG. 2 as seen from the rear of and from obliquely above the vehicle; FIG. 4 is a side view of a rear suspension device on a left side of the vehicle in the rear suspension device shown in FIG. 3 as seen from the left side of the vehicle; FIG. 5 is a bottom view of the rear suspension device on the left side of the vehicle in the rear suspension device shown in FIG. 3 as seen from below; FIG. 6 is a perspective view showing the battery assembly, the vehicle body frame, and the front suspension device in the lower part of the vehicle shown in FIG. 2 as seen from the rear of and from obliquely above the vehicle; FIG. 7 is a side view of a front suspension device on the left side of the vehicle in the front suspension device shown in FIG. 6 as seen from the left side of the vehicle; and FIG. 8 is a bottom view of the front suspension device on the left side of the vehicle in the front suspension device shown in FIG. 6 as seen from below.

First, as shown in FIG. 1 to FIG. 5, the rear vehicle body frame 6 includes a base member 16 which is fixed to a rear end edge of the battery case 14, two rear side frames 18 which are integrally formed with the base member 16 by welding or the like and which extend in the vehicle front-rear direction, and two rear cross members 20 which are mounted to the rear side frames 18 by fastening using bolts, welding, and the like. The base member 16 of the rear vehicle body frame 6 is directly connected to a frame member 14b at the rear end edge of the battery case 14 by fastening using bolts, welding, and the like, and rigidity of a lower portion of the vehicle body is increased by the frame members of four sides of the battery case 14 and the rear vehicle body frame 6.

Next, as shown in FIG. 3 to FIG. 5, the rear cross members 20 function as rear suspension support members 20a and 20b for supporting the rear suspension device 10. In this manner, the rear suspension device 10 is mounted via the rear suspension support members 20a and 20b to the rear side frames 18 which are directly connected to the battery case 14.

Next, as shown in FIG. 1, FIG. 2, and FIG. 6 to FIG. 8, the front vehicle body frame 8 includes a base member 22 which is fixed to a front end edge of the battery case 14, two front side frames 24 which are integrally formed with the base member 22 by welding or the like and which extend in the vehicle front-rear direction and extend obliquely in a vehicle width direction, a front cross member 26 which is mounted to the front side frames 24, and front suspension support members 28 which are integrally formed with the base member 22, which extend forward along each front side frame 24, and for supporting the front suspension device 12.

The base member 22/front suspension support members 28 of the front vehicle body frame 8 are directly connected to a frame member 14c at the front end edge of the battery case 14 by fastening using bolts, welding, and the like, and rigidity of the lower portion of the vehicle body is increased by the frame members of four sides of the battery case 14 and the front vehicle body frame 8.

Next, the vehicle body 2 constituted of a monocoque body in the upper portion of the vehicle 1 shown in FIG. 1 and FIG. 2 is mounted to the frame members of the four sides of the battery case 14, the rear cross member 20, the front cross member 26, and the like in the lower portion of the vehicle body by fastening using bolts, welding, and the like to be integrally constructed as the vehicle 1.

Next, as shown in FIG. 2 and FIG. 3 to FIG. 5, a rear electric motor (motor) 30 which has a large output and which is to be used as a main drive source is provided in a rear portion of the vehicle. The rear electric motor 30 is connected to rear wheels 34 (indicated by imaginary lines in FIG. 4 and FIG. 5) via two output transmission shafts 32 which extend to the left and the right from the rear electric motor 30 and drives the rear wheels 34. In other words, in the vehicle 1 according to the present embodiment, the rear wheels are main drive wheels.

On the other hand, as shown in FIG. 2 and FIG. 6 to FIG. 8, a front electric motor (motor) 36 which has a smaller output than the rear electric motor 30 and which is to be used as an auxiliary drive source is provided in a front portion of the vehicle. The front electric motor 36 is connected to front wheels 40 (indicated by imaginary lines in FIG. 7 and FIG. 8) via two output transmission shafts 38 which extend to the left and the right from the front electric motor 36 and drives the front wheels 40. Accordingly, in the vehicle 1 according to the present embodiment, the front wheels are auxiliary drive wheels.

Next, with reference to FIG. 3 to FIG. 5, a configuration of the rear suspension device 10 and a mounting structure thereof to the vehicle body will be explained. FIG. 4 and FIG. 5 show the rear suspension device 10 on a left side of the vehicle. Since the rear suspension device 10 on a right side of the vehicle shares a same configuration as the rear suspension device 10 on the left side of the vehicle, hereinafter, a description of the rear suspension device 10 on the right side of the vehicle will be omitted.

First, as shown in FIG. 3 to FIG. 5, the rear suspension device 10 includes a hub carrier 42 for supporting the rear wheel 34. In the hub carrier 42, an opening which holds a hub 44 and which is to be penetrated by an output transmission shaft (axle) 32 is formed in a center portion thereof. In addition, the rear suspension device 10 includes a rear lower arm 46, a rear damper 48, and a toe control link 50 that are each coupled to the hub carrier 42. The rear damper 48 constitutes a shock absorber together with a coil spring 49. As shown in FIG. 4, the rear suspension device 10 is positioned above a lower end of the battery case 14.

The suspension components described above will now be described in greater detail. First, the rear lower arm 46 is an A-shaped lower arm, and a distal end portion thereof on a side of the wheel 34 is coupled via a swinging shaft 52 to a portion which protrudes downward from a center portion of the hub carrier 42. In the present embodiment, the swinging shaft 52 is constituted of a pillow ball joint. On the other hand, the A-shaped rear lower arm 46 is coupled at two locations thereof on a vehicle body side to the rear suspension support members 20a and 20b via swinging shafts 54 and 56, respectively. In the present embodiment, each of the swinging shafts 54 and 56 is constituted of a bush housing, elastic bushing, a bolt shaft mounted on a vehicle body side, and the like.

In the present embodiment, as shown in FIG. 5, a position of each of the swinging shafts 54 and 56 is set such that a swinging axis A formed by each of the swinging shafts 54 and 56 extends in a direction coinciding with the vehicle front-rear direction in a bottom view (plan view). In addition, in the present embodiment, as shown in FIG. 4, the position and an inclination of each of the swinging shafts 54 and 56 are set such that the swinging axis A formed by each of the swinging shafts 54 and 56 extends in an inclined manner in a direction of a predetermined obliquely-upward angle toward the front of the vehicle in a side view.

Next, as clearly shown in FIG. 3, a lower end portion of the rear damper 48 is mounted in a vehicle up-down direction in a distal end portion of a portion extending inward in the vehicle width direction above a center portion of the hub carrier 42. On the other hand, an upper end portion of the rear damper 48 is mounted to the vehicle body 2. In the present embodiment, as shown in FIG. 4, the rear damper 48 is mounted to the hub carrier 42 and the vehicle body 2 so that a longitudinal direction axis B of the rear damper 48 (a direction of extension of the rear damper 48) vertically extends in a direction of 90 degrees relative to a direction of extension of the swinging axis A in a side view.

Next, the toe control link 50 is coupled to a portion which protrudes rearward from a center portion of the hub carrier 42.

Next, with reference to FIG. 6 to FIG. 8, a configuration of the front suspension device 12 and a mounting structure thereof to the vehicle body will be explained. FIG. 7 and FIG. 8 show the front suspension device 12 on the left side of the vehicle. Since the front suspension device 12 on the right side of the vehicle shares a same configuration as the front suspension device 12 on the left side of the vehicle, hereinafter, a description of the front suspension device 12 on the right side of the vehicle will be omitted.

First, as shown in FIG. 6 to FIG. 8, the front suspension device 12 includes a hub carrier 60 for supporting the front wheel 40. In the hub carrier 60, an opening which holds a hub 62 and which is to be penetrated by an output transmission shaft (axle) 38 is formed in a center portion thereof. In addition, the front suspension device 12 includes a front lower arm 66, a front damper 68, and a tie rod (not illustrated) which controls an orientation of a toe direction of the front wheel 40 with a steering mechanism (not illustrated) that are each coupled to the hub carrier 60. The front damper 68 constitutes a shock absorber together with a coil spring 69.

The suspension components described above will now be described in greater detail. First, the front lower arm 66 is an L-shaped lower arm, and a distal end portion thereof on a side of the wheel 40 is coupled via a swinging shaft 72 to a portion which protrudes downward from a center portion of the hub carrier 60. In the present embodiment, the swinging shaft 72 is constituted of a pillow ball joint. On the other hand, the L-shaped front lower arm 66 is coupled at two locations thereof on a vehicle body side to the front suspension support members 28 described above via swinging shafts 74 and 76, respectively. In the present embodiment, each of the swinging shafts 74 and 76 is constituted of a bush housing, elastic bushing, a bolt shaft mounted on a vehicle body side, and the like.

In the present embodiment, as shown in FIG. 8, a position of each of the swinging shafts 74 and 76 is set such that a swinging axis A formed by each of the swinging shafts 74 and 76 extends in a direction coinciding with the vehicle front-rear direction in a bottom view (plan view). In addition, in the present embodiment, as shown in FIG. 7, the position and an inclination of each of the swinging shafts 74 and 76 are set such that the swinging axis A formed by each of the swinging shafts 74 and 76 extends obliquely upward at a predetermined angle toward the front of the vehicle in a side view.

Next, as clearly shown in FIG. 6, a lower end portion of the front damper 68 is mounted in the vehicle up-down direction in a distal end portion of a portion extending inward in the vehicle width direction above a center portion of the hub carrier 60. On the other hand, an upper end portion of the front damper 68 is mounted to the vehicle body 2. In the present embodiment, as shown in FIG. 7, the front damper 68 is mounted to the hub carrier 60 and the vehicle body 2 so that a longitudinal direction axis B of the front damper 68 (a direction of extension of the front damper 68) vertically extends in a direction of 90 degrees relative to a direction of extension of the swinging axis A in a side view.

Next, the tie rod (not illustrated) is coupled to a portion protruding forward from a center portion of the hub carrier 60.

Figure 9A:
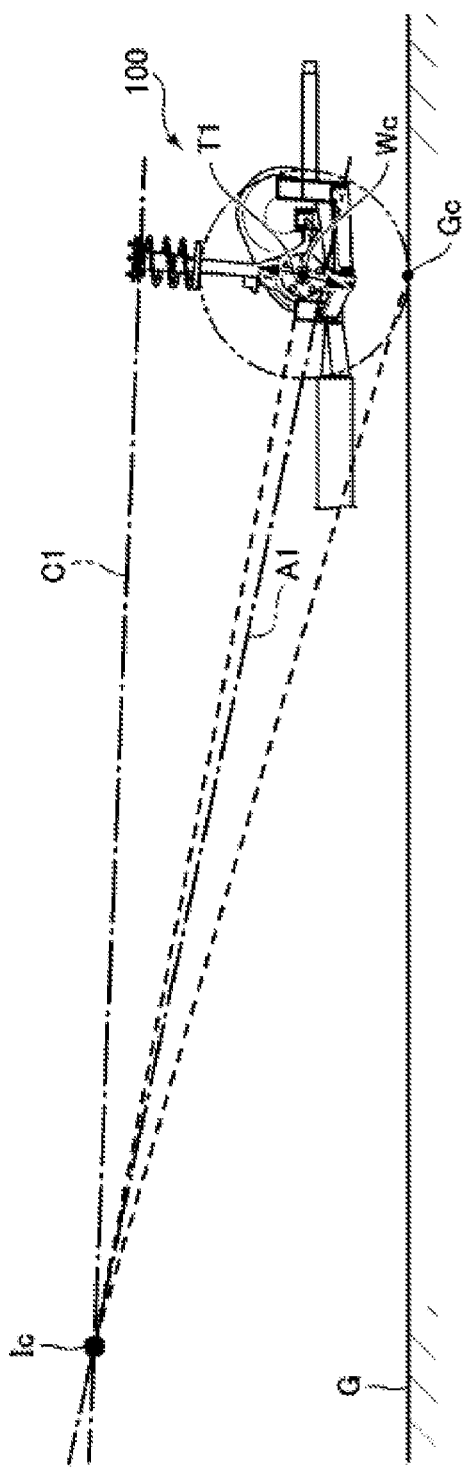
FIG. 9A is a conceptual diagram for explaining a relationship between an anti-tail-lift angle during friction braking and an anti-tail-lift angle during regenerative braking according to a comparative example.
Figure 9B:
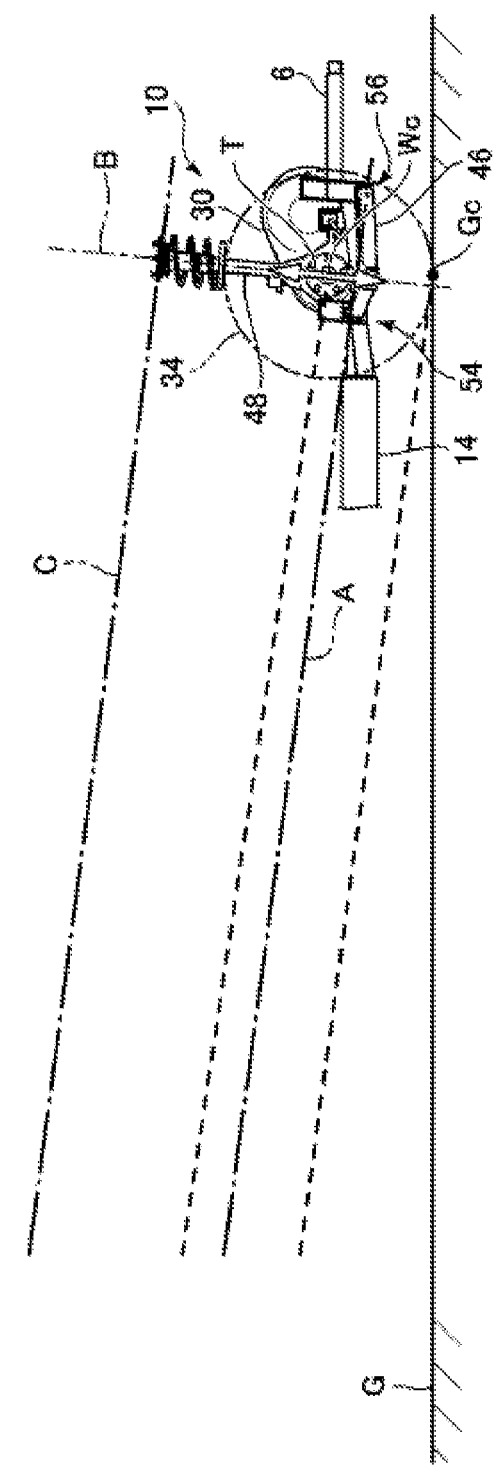
FIG. 9B is a conceptual diagram for explaining a relationship between an anti-tail-lift angle during friction braking and an anti-tail-lift angle during regenerative braking according to an embodiment of the present disclosure.

Next, a main geometric configuration of the suspension device according to the embodiment of the present disclosure will be described with reference to FIGS. 9A and 9B. FIG. 9A is a conceptual diagram for explaining a relationship between an anti-tail-lift angle during friction braking and an anti-tail-lift angle during regenerative braking according to a comparative example. FIG. 9B is a conceptual diagram for explaining a relationship between an anti-tail-lift angle during friction braking and an anti-tail-lift angle during regenerative braking according to the embodiment of the present disclosure. FIGS. 9A-9B show the rear suspension device 10 (100). In the present embodiment, since the front suspension device 12 also shares a same geometric configuration as the rear suspension device 10, hereinafter, a description of the front suspension device 12 will be omitted. Note that FIGS. 9A-9B show a state of each portion when the vehicle is stationary (a 1G state). FIG. 3 to FIG. 8 described above also show a state of each portion when the vehicle is stationary.

First, as shown in FIG. 9A, in a conventional vehicle according to the comparative example, normally, an instantaneous center of rotation Ic of the rear suspension device 100 is set to be positioned higher than and closer to the inside of the vehicle than the rear suspension device 100 in a side view so that a predetermined anti-tail-lift force is obtained during braking. Note that the instantaneous center of rotation Ic is an intersection of an imaginary line C1 which is perpendicular to a longitudinal direction axis of a rear damper and an swinging axis A1 of a lower arm.

When using regenerative brakes in a vehicle with an electric motor (a so-called electric car), since an operation point of a braking force thereof is a wheel center Wc, an anti-tail-lift angle is an angle of a line (indicated by a dashed line in FIG. 9A) connecting the instantaneous center of rotation Ic and the wheel center Wc to each other relative to the ground G. On the other hand, when using friction brakes (such as disk brakes inside the wheels), since an operation point of a braking force thereof is a center of tire-ground contact Gc, the anti-tail-lift angle is an angle of a line (indicated by a dashed line in FIG. 9A) connecting the instantaneous center of rotation Ic and the center of tire-ground contact Gc to each other relative to the ground G.

Therefore, in comparative examples such as that shown in FIG. 9A, changing braking forces of friction brakes and regenerative brakes when, for example, the friction brakes and the regenerative brakes are subjected to coordinated control or switching between the friction brakes and the regenerative brakes is carried out causes a pitching behavior of the rear portion of the vehicle to change due to a difference in anti-tail-lift angles and, accordingly, the behavior of the entire vehicle becomes unstable. Note that, in FIG. 9A, a reference sign T1 denotes a trajectory of motion of the rear wheel, and the swing trajectory T1 is a trajectory which extends in an arc shape in a direction perpendicular to the line connecting the instantaneous center of rotation Ic and the wheel center Wc to each other.

On the other hand, in the present embodiment, as shown in FIG. 9B and FIG. 4, the longitudinal direction axis B of the rear damper 48 extends perpendicular to the swinging axis A in a side view and, accordingly, an imaginary line C which is perpendicular to the longitudinal direction axis B of the rear damper 48 extends parallel to the swinging axis A. In addition, in the present embodiment, as shown in FIG. 5, the swinging axis A extends in a direction coinciding with the vehicle front-rear direction in a bottom view (plan view).

Furthermore, in the present embodiment, by causing the swinging axis A to extend in a direction coinciding with the vehicle front-rear direction in a bottom view, as shown in FIG. 9B, a ball joint 52 of the rear lower arm 46 and the rear wheel 34 linearly swing (a swing trajectory thereof is denoted by a reference sign T) in an up-down direction which coincides with a direction of extension of the longitudinal direction axis B of the rear damper 48. Since the rear lower arm 46 swings around the swinging axis A which extends in the vehicle front-rear direction, the swing trajectory T of the ball joint 52 on a wheel-side assumes a linear shape in a side view. In addition, in the present embodiment, as shown in FIG. 9B and FIG. 4, the swinging axis A of the rear lower arm 46 is extended obliquely upward toward the front of the vehicle in a side view and, accordingly, an anti-lift angle is formed in the rear suspension device 10.

In the present embodiment, due to a suspension geometry set as described above, as shown in FIG. 9B, an anti-tail-lift angle when using regenerative brakes and an anti-tail-lift angle when using friction brakes in the vehicle 1 with an electric motor are made to be similar angles. Accordingly, in the present embodiment, for example, during coordinated control of the friction brakes and the regenerative brakes, a change in a pitching behavior of the rear portion of the vehicle is prevented to stabilize the behavior of the vehicle.

In addition, as shown in FIG. 9B, by configuring the rear damper 48 to extend perpendicular to the swinging axis A in a side view, a linear swing direction (trajectory of motion) T of the rear wheel 34 and the longitudinal direction axis B of the rear damper are made to coincide with each other. Accordingly, in the present embodiment, a load transmitted from the rear wheel 34 is efficiently input to the rear damper 48 via the hub carrier 42 to operate the rear damper 48 in an efficient manner.

Furthermore, in the present embodiment, since the drive of the rear wheel 34 is used as a main drive by using the rear electric motor 30 as a main drive source with a large output, as shown in FIG. 9B, due to the anti-lift angle formed in the rear suspension device 10, a lift of particularly the rear portion of the vehicle body can be prevented during use of the regenerative brakes and the friction brakes.

As described above, the technical idea of the present disclosure is to, firstly, extend a damper 48 in a direction perpendicular to a swinging axis A and cause an imaginary line C which is perpendicular to a longitudinal direction axis B of the damper 48 to extend in a direction parallel to the swinging axis A in a side view so as to create a state where an instantaneous center of rotation does not exist or to make an instantaneous center of rotation at a position separated by an infinite distance (in particular, with respect to a position of an instantaneous center of rotation Ic such as that shown in FIG. 9A) and, accordingly, prevent a change in a pitching behavior of a vehicle even when braking forces of regenerative brakes and friction brakes are changed.

In addition, the technical idea of the present disclosure is to, secondly, cause the swinging axis A to extend in a direction coinciding with a vehicle front-rear direction in a bottom view (plan view) so as to create a state where an instantaneous center of rotation does not exist or to make an instantaneous center of rotation at a position separated by an infinite distance (in particular, with respect to a position of an instantaneous center of rotation Ic such as that shown in FIG. 9A) and, accordingly, prevent a change in a pitching behavior of the vehicle even when braking forces of regenerative brakes and friction brakes are changed.

Furthermore, the technical idea of the present disclosure is to, thirdly, form an anti-lift angle by causing the swinging axis A to extend obliquely upward toward a front of the vehicle in a side view and, accordingly, prevent a change in a pitching behavior of the vehicle (in particular, a change in a pitching behavior of a rear portion of the vehicle) during coordinated control of the regenerative brakes and the friction brake and the like.

Moreover, the technical idea of the present disclosure is to, fourthly, cause the swinging axis A to extend in a direction coinciding with the vehicle front-rear direction in a bottom view (plan view) and, at the same time, cause the damper 48 to extend in a direction perpendicular to the swinging axis A in a side view so that a linear swing direction (trajectory of motion) T of the rear wheel 34 (ball joint 52) and the longitudinal direction axis B of a rear damper coincide with each other and, accordingly, enable a load transmitted from the rear wheel 34 to be efficiently input to the rear damper 48.

The technical idea of the present disclosure described above is applied to the front suspension device 12 in a similar manner.

As described above, in the present disclosure, an angle of the longitudinal direction axis B of the damper relative to the swinging axis A in a side view, parallelism of the swinging axis A and the imaginary line C in a side view, and a direction of extension of the swinging axis A in a bottom view are important. On the other hand, these values are not limited to those in the embodiment described above and, for example, when designing a vehicle, performing an experiment with a test vehicle, or the like, the values may be adjusted to ranges (angle, parallelism, and direction) in which a change in a pitching behavior of the vehicle can be substantially prevented during coordinated control of friction brakes and regenerative brakes and the like in consideration of a length of a wheel base or a position of the center of gravity of the vehicle, motion of each portion during swinging of the suspension, and the like which affect the pitching behavior of the vehicle. For example, the angle formed by the swinging axis A and the longitudinal direction axis B of the rear damper 48 is preferably set to a range of 90°±2.5°.

As a modification of the vehicle 1 according to the present embodiment, only the front electric motor 36 may be provided as the electric motor to drive the front wheels 40 and make the vehicle 1 a front-wheel drive vehicle, only the rear electric motor 30 may be provided as the electric motor to drive the rear wheels 34 and make the vehicle 1 a rear-wheel drive vehicle, or the front wheels 40 and the rear wheels 34 may be driven by a single electric motor.

In addition, the present disclosure is not limited to the strut-type suspension device described above and can also be applied to suspension devices of other types. For example, with a double wishbone-type suspension device, by causing a swinging axis of a lower arm and a swinging axis of an upper arm to extend in directions parallel to each other in a side view and causing the swinging axes to extend in a direction coinciding with the vehicle front-rear direction in a bottom view (plan view), a similar effect of preventing a change in a pitching behavior of the vehicle even when braking forces of regenerative brakes and friction brakes are changed can be obtained. A similar effect can also be obtained by a measure of causing each swinging axis to extend obliquely upward toward the front of the vehicle in a side view.

Figure 10:
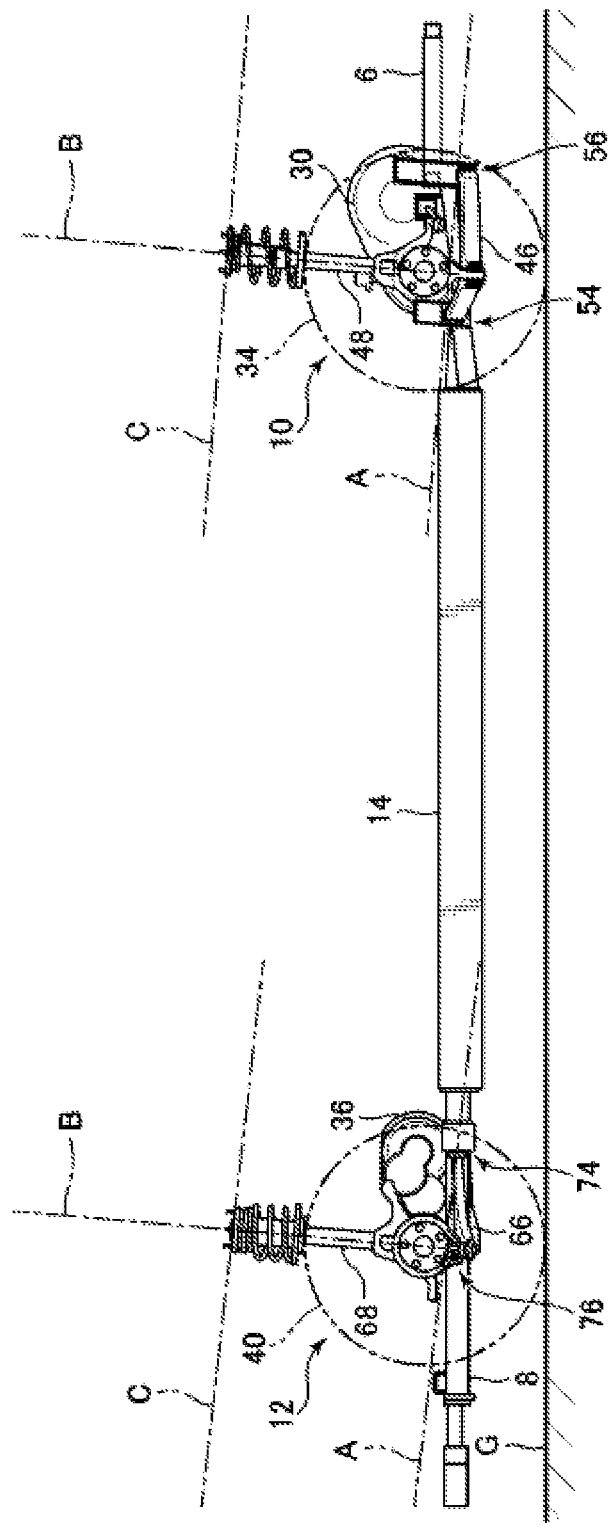
FIG. 10 is a conceptual diagram showing a relationship among a swinging axis of a lower arm, a direction of extension of a damper, and an imaginary line perpendicular to the direction of extension of the damper in the front suspension device and the rear suspension device according to the embodiment of the present disclosure.

Next, a main geometry of the suspension device according to the embodiment of the present disclosure and an effect thereof will be further described with reference to FIG. 10. FIG. 10 is a conceptual diagram showing a relationship among a swinging axis of a lower arm, a direction of extension of a damper, and an imaginary line perpendicular to the direction of extension of the damper in the front suspension device and the rear suspension device according to the embodiment of the present disclosure.

As shown in FIG. 10, in the present embodiment, in the rear suspension device 10 and the front suspension device 12, a direction of extension of the longitudinal direction axes B of the dampers 48 and 68 is made to be a direction perpendicular to the swinging axes A of the lower arms 46 and 66, the imaginary lines C perpendicular to the longitudinal direction axes B of the dampers 48 and 68 are made to extend in a direction parallel to the swinging axes A, and the swinging axes A of the lower arms 46 and 66 are made to extend obliquely upward toward the front of the vehicle in a side view. In the present embodiment, by preventing a difference in anti-lift angles (anti-dive angles) between the regenerative brakes and the friction brakes from occurring in the front wheels 40 and the rear wheels 40 due to such a configuration, a difference in behavior change between the front portion of the vehicle and the rear portion of the vehicle is prevented and, accordingly, a change in the pitching behavior of the entire vehicle during use of the regenerative brakes and the friction brakes is prevented.

In the vehicle 1 according to the present embodiment, an output of the front electric motor 36 is set smaller than an output of the rear electric motor 30 so as to prevent a large drive force from being applied to the front wheels 40. As a result, while making the effect of an anti-nose-lift angle of the front portion of the vehicle negligible when being driven due to the smaller output, with respect to the regenerative brakes and the friction brakes which act on the front wheels 40 during braking, the imaginary line C perpendicular to the longitudinal direction axis B of the front damper 68 is made to extend in a direction parallel to the swinging axis A as described above to prevent a change in the pitching behavior of the entire vehicle during use of the regenerative brakes and the friction brakes.

If the swinging axis A and the imaginary line C are parallel to each other in both the rear suspension device 10 and the front suspension device 12, an attitude change of the vehicle during coordinated control of the friction brakes and the regenerative brakes can be prevented regardless of differences in anti-lift angles and anti-dive angles between the rear suspension device 10 and the front suspension device 12.

Next, a working effect of the present embodiment will be described.

The present embodiment provides suspension devices 10 and 12 of a vehicle 1 equipped with electric motors 30 and 36 for transmitting a drive force to front wheels 40 and rear wheels 34 (in a modification, at least one of the front wheels 40 or the rear wheels 34) via output transmission shafts 32 and 38, the suspension devices including: a front lower arm 66 capable of swinging in a vehicle up-down direction with reference to a front wheel swinging axis A in a vehicle body-side mounting portion in a front portion of the vehicle; a front damper 68 which extends in a direction perpendicular to the front wheel swinging axis A in a side view; a rear lower arm 46 capable of swinging in the vehicle up-down direction with reference to a rear wheel swinging axis A in a vehicle body-side mounting portion in a rear portion of the vehicle; and a rear damper 48 which extends in a direction perpendicular to the rear wheel swinging axis A in a side view, wherein, in a side view, the front wheel swinging axis A and a first imaginary line C perpendicular to a direction of extension of the front damper 68 extend in a direction parallel to each other and, at the same time, the rear wheel swinging axis A and a second imaginary line C perpendicular to a direction of extension of the rear damper 48 extend in a direction parallel to each other.

According to the present embodiment configured as described above, in a side view, since the front wheel swinging axis A and the first imaginary line C perpendicular to the direction of extension of the front damper 68 extend in a direction parallel to each other and, at the same time, the rear wheel swinging axis A and the second imaginary line C perpendicular to the direction of extension of the rear damper 48 extend in a direction parallel to each other, an occurrence of a difference in behavior changes of the front portion of the vehicle and the rear portion of the vehicle can be prevented during braking of the front and rear wheels 40 and 34 on which regenerative brakes act (in a modification, during braking of the front and rear wheels 40 and 34 in which regenerative brakes act on at least one of the front wheels 40 or the rear wheels 34) and, accordingly, a change in a pitching behavior of the entire vehicle can be prevented during use of the regenerative brakes and friction brakes such as when the friction brakes and the regenerative brakes are subjected to coordinated control and a sense of discomfort imparted to an occupant can be reduced.

In addition, according to the present embodiment, since the front wheel swinging axis A and the rear wheel swinging axis A respectively extend in a direction coinciding with the vehicle front-rear direction in a bottom view, an occurrence of a difference in behavior changes of the front portion of the vehicle and the rear portion of the vehicle can be more reliably prevented and, accordingly, a change in a pitching behavior of the entire vehicle can be prevented, for example, when the friction brakes and the regenerative brakes are subjected to coordinated control, and a sense of discomfort imparted to an occupant can be reduced. In addition, since (respective wheel centers We of) the front wheels 40 and the rear wheels 34 can each be made to linearly swing in a same direction as the directions of extension of the dampers 68 and 48, a change in the behavior of the entire vehicle during use of the regenerative brakes and the friction brakes can be prevented more effectively.

Furthermore, according to the present embodiment, since the front wheel swinging axis A and the rear wheel swinging axis A each extend obliquely upward toward the front of the vehicle in a side view, an anti-lift angle is particularly formed in the rear suspension device 10 and a lift of the rear portion of the vehicle body during use of the regenerative brakes and the friction brakes is prevented. Moreover, according to the present embodiment, since the front wheel swinging axis A and the first imaginary line C perpendicular to the direction of extension of the front damper 68 extend in a direction parallel to each other and the rear wheel swinging axis A and the second imaginary line C perpendicular to the direction of extension of the rear damper extend in a direction parallel to each other, a difference between the behavior of the front portion of the vehicle and the behavior of the rear portion of the vehicle during braking of front and rear wheels can be reduced and, accordingly, a change in a pitching behavior of the entire vehicle during use of the regenerative brakes and friction brakes can be prevented.

In addition, according to the present embodiment, since the rear electric motor 30 which is mounted to the vehicle body in the rear portion of the vehicle and which drives the rear wheels 34 is provided and the rear wheels 34 are driven using the rear electric motor 30 provided in the rear portion of the vehicle as a main drive source, although a braking force of the regenerative brakes which act on the rear wheels 34 increases due to the use of the rear wheels 34 as main drive wheels, since the rear wheel swinging axis A and the second imaginary line C extend in a direction parallel to each other, a change in the pitching behavior of the rear portion of the vehicle during use of the regenerative brakes and the friction brakes of the rear wheels 34 can be prevented more effectively. In addition, a lift of the front portion of the vehicle during travel start of the vehicle due to the use of the rear wheels 34 as main drive wheels can be prevented.

Furthermore, according to the present embodiment, since the front wheel swinging axis A and the rear wheel swinging axis A respectively extend obliquely upward toward the front of the vehicle in a side view, the front electric motor 36 mounted to the vehicle body in the front portion of the vehicle and the rear electric motor 30 mounted to the vehicle body in the rear portion of the vehicle are provided, and the rear electric motor 30 provided in the rear portion of the vehicle is used as a main drive, a difference in anti-lift angles (anti-dive angles) between the regenerative brakes and the friction brakes can be prevented from occurring or can be made extremely small in both the front wheels 40 and the rear wheels 34 and, therefore, a change in the behavior of the entire vehicle during use of the regenerative brakes and the friction brakes can be more reliably prevented. In particular, since the rear electric motor 30 is used as a main drive, due to the anti-lift angle of the rear suspension device 10, a lift of the rear portion of the vehicle body can be prevented during use of the regenerative brakes and the friction brakes.

In addition, according to the present embodiment, since the front lower arm 66 and the rear lower arm 46 are mounted to the vehicle body frames 6 and 8 which extend in the vehicle front-rear direction from the battery case 14 disposed in a lower portion of the center of the vehicle, support rigidity of each of the front wheels 40 and the rear wheels 34 can be increased and a response delay to vehicle behavior (for example, a response delay to a cornering force) can be reduced.

Furthermore, according to the present embodiment, since the front suspension device 12 and the rear suspension device 10 are strut-type suspension devices including hub carriers 60 and 42 in which openings for allowing penetration by and for holding output transmission shafts 32 and 38 are formed in a center portion thereof and which support the wheels 40 and 34, wherein lower portions of the front damper 68 and the rear damper 48 are mounted to the hub carriers 60 and 42, and upper portions of the front damper 68 and the rear damper 48 are mounted to the vehicle body 2, a change in the behavior of the entire vehicle during use of the regenerative brakes and the friction brakes can be prevented with the strut-type suspension which are relatively simple constructions.

What is claimed is:

1. A suspension device for a vehicle equipped with an electric motor for transmitting a drive force to at least one of a front wheel or a rear wheel via an output transmission shaft, the suspension device comprising:
    a front suspension arm capable of swinging in a vehicle up-down direction with reference to a front wheel swinging axis in a vehicle body-side mounting portion in a front portion of the vehicle;
    a front damper having a longitudinal axis which extends in a direction perpendicular to the front wheel swinging axis in a side view;
    a rear suspension arm capable of swinging in the vehicle up-down direction with reference to a rear wheel swinging axis in a vehicle body-side mounting portion in a rear portion of the vehicle; and
    a rear damper having a longitudinal axis which extends in a direction perpendicular to the rear wheel swinging axis in a side view, wherein
    the front wheel swinging axis and a first imaginary line perpendicular to a direction of extension of the longitudinal axis of the front damper extend in a direction parallel to each other and the rear wheel swinging axis and a second imaginary line perpendicular to a direction of extension of the longitudinal axis of the rear damper extend in a direction parallel to each other in a side view;
    the suspension device includes front and rear wheel hub carriers to which wheel-side end portions of the front suspension arm and the rear suspension arm are respectively coupled and which respectively support the front wheel and the rear wheel; and
    the longitudinal axis of the front damper is aligned with a center of the front wheel hub carrier in the side view and the longitudinal axis of the rear damper is aligned with a center of the rear wheel hub carrier in the side view.

2. The suspension structure for a vehicle according to claim 1, wherein the front wheel swinging axis and the rear wheel swinging axis respectively extend in a direction coinciding with a vehicle front-rear direction in a bottom view.

3. The suspension device for a vehicle according to claim 2, wherein the front wheel swinging axis and the rear wheel swinging axis each extend obliquely upward toward a front of the vehicle in a side view.

4. The suspension device for a vehicle according to claim 1, wherein the electric motor includes a rear electric motor which is mounted to the vehicle body in the rear portion of the vehicle and which drives the rear wheel, and the rear electric motor provided in the rear portion of the vehicle is used as a main drive source.

5. The suspension device for a vehicle according to claim 1, wherein
the front wheel swinging axis and the rear wheel swinging axis each extend obliquely upward toward a front of the vehicle in a side view, and
the electric motor includes a front electric motor which is mounted to the vehicle body in the front portion of the vehicle and a rear electric motor which is mounted to the vehicle body in the rear portion of the vehicle, and the rear electric motor provided in the rear portion of the vehicle is used as a main drive.

6. The suspension device for a vehicle according to claim 1, wherein the front suspension arm and the rear suspension arm are mounted to a vehicle body frame which extends in a vehicle front-rear direction from a battery case disposed in a lower portion of a center of the vehicle.

7. The suspension device for a vehicle according to claim 1, wherein the suspension device is a strut-type suspension device, a lower portion of the front damper and a lower portion of the rear damper are respectively mounted to the hub carriers, and upper portions of the front damper and the rear damper are each mounted to the vehicle body.

8. The suspension device for a vehicle according to claim 1, wherein the front wheel swinging axis and the rear wheel swinging axis each extend obliquely upward toward a front of the vehicle in a side view.

9. A suspension device for a vehicle equipped with an electric motor for transmitting a drive force to at least one of a front wheel or a rear wheel via an output transmission shaft, the suspension device comprising:

a front suspension arm capable of swinging in a vehicle up-down direction with reference to a front wheel swinging axis in a vehicle body-side mounting portion in a front portion of the vehicle;
a front damper having a longitudinal axis which extends in a direction perpendicular to the front wheel swinging axis in a side view;
a rear suspension arm capable of swinging in the vehicle up-down direction with reference to a rear wheel swinging axis in a vehicle body-side mounting portion in a rear portion of the vehicle; and
a rear damper having a longitudinal axis which extends in a direction perpendicular to the rear wheel swinging axis in a side view, wherein
the front wheel swinging axis and a first imaginary line perpendicular to a direction of extension of the longitudinal axis of the front damper extend in a direction parallel to each other and the rear wheel swinging axis and a second imaginary line perpendicular to a direction of extension of the longitudinal axis of the rear damper extend in a direction parallel to each other in a side view;
the suspension device is a strut-type suspension device including front and rear wheel hub carriers to which wheel-side end portions of the front suspension arm and the rear suspension arm are respectively coupled and which respectively support the front wheel and the rear wheel, a lower portion of the front damper and a lower portion of the rear damper are respectively mounted to the hub carriers, and upper portions of the front damper and the rear damper are each mounted to the vehicle body; and
the longitudinal axis of the front damper is aligned with a center of the front wheel in the side view and the longitudinal axis of the rear damper is aligned with a center of the rear wheel in the side view.

* * * * *